(12) United States Patent
Zheng et al.

(10) Patent No.: US 9,878,454 B1
(45) Date of Patent: Jan. 30, 2018

(54) FLEXIBLE CLAMPING DEVICE

(71) Applicant: CITIC Dicastal CO., LTD., Qinhuangdao (CN)

(72) Inventors: Yao Zheng, Qinhuangdao (CN); Jiandong Guo, Qinhuangdao (CN); Lei Yang, Qinhuangdao (CN); Zhiyuan Yu, Qinhuangdao (CN); Weimin Cai, Qinhuangdao (CN); Bowen Xue, Qinhuangdao (CN); Xiaoguang Huang, Qinhuangdao (CN); Xuesong Wang, Qinhuangdao (CN); Yuexin Lu, Qinhuangdao (CN); Yukun Yang, Qinhuangdao (CN); Yongwang Zhao, Qinhuangdao (CN)

(73) Assignee: CITIC DICASTAL CO., LTD (CN)

( * ) Notice: Subject to any disclaimer, the term of this patent is extended or adjusted under 35 U.S.C. 154(b) by 0 days.

(21) Appl. No.: 15/594,540

(22) Filed: May 12, 2017

(30) Foreign Application Priority Data

Feb. 24, 2017 (CN) .......................... 2017 1 0103786

(51) Int. Cl.
 *B25B 1/12* (2006.01)
 *B25J 15/00* (2006.01)
(52) U.S. Cl.
 CPC ................................ *B25J 15/0028* (2013.01)
(58) Field of Classification Search
 CPC ........... B25B 1/02; B25B 5/061; B25B 5/122; B25B 5/02; B25B 3/00
 See application file for complete search history.

(56) References Cited

U.S. PATENT DOCUMENTS

| | | | | |
|---|---|---|---|---|
| 4,817,939 A | * | 4/1989 | Augspurger | A63B 22/16 482/2 |
| 4,956,910 A | * | 9/1990 | Banner | H01R 43/06 29/593 |
| 5,027,909 A | * | 7/1991 | Carter | B23K 11/314 173/52 |
| 5,058,286 A | * | 10/1991 | Chisum | G01B 5/207 33/288 |

(Continued)

*Primary Examiner* — Lee D Wilson
(74) *Attorney, Agent, or Firm* — Kwan & Olynick LLP

(57) ABSTRACT

The present disclosure provides a flexible clamping device, which is composed of a housing, a shaft I, a sleeve I, a cylinder, a connector, a shaft II, a clamping spring, a protective pad, a pressure block, a shaft III, a sleeve II and a bottom plate. The bottom plate is provided with two steps on which wheels having different sizes are fixed respectively. When the large-sized wheel is put on the bottom step, the cylinder drives the connector to move right in a plane, the protective pad on the pressure block presses the hub of the wheel, and the function of compacting the large-sized wheel is thus realized; when the small-sized wheel is put on the bottom step, the cylinder drives the connector to continuously move right in the plane, the protective pad on the pressure block presses the hub of the wheel, and the function of compacting the small-sized wheel is thus realized. The flexible clamping device in use can meet the requirement of mixed-line high precision clamping in the wheel burr brushing process, has the characteristics of ideal effect, high efficiency, safety and reliability in work and high degree of automation, and is particularly suitable for batch production on production lines.

2 Claims, 13 Drawing Sheets

(56) References Cited

U.S. PATENT DOCUMENTS

| | | | |
|---|---|---|---|
| 8,282,075 B2* | 10/2012 | Chan | B66F 3/46 |
| | | | 254/1 |
| 9,566,827 B2* | 2/2017 | Hodges | B60B 30/00 |
| 2008/0093472 A1* | 4/2008 | Hohne | E01B 9/483 |
| | | | 238/351 |
| 2009/0259107 A1* | 10/2009 | Crenshaw | A61B 5/0051 |
| | | | 600/202 |

* cited by examiner

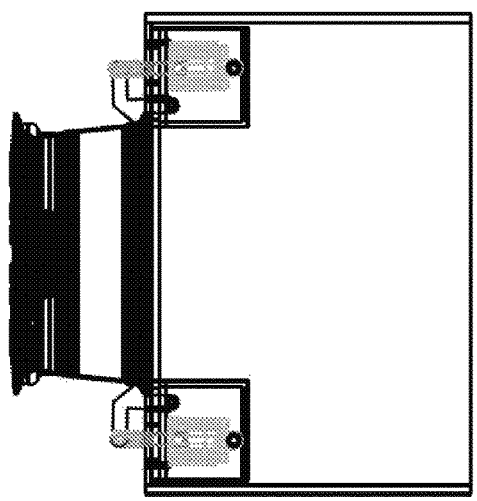
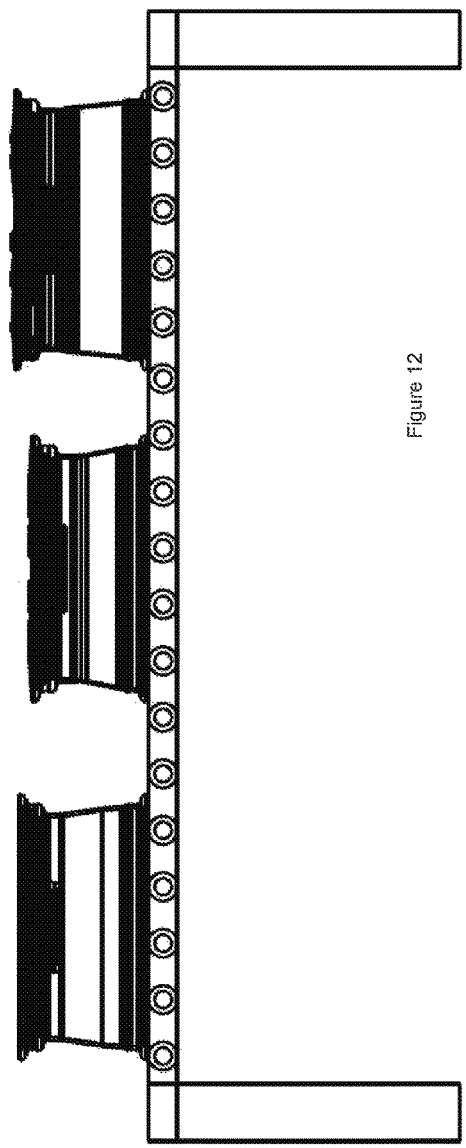
Figure 12

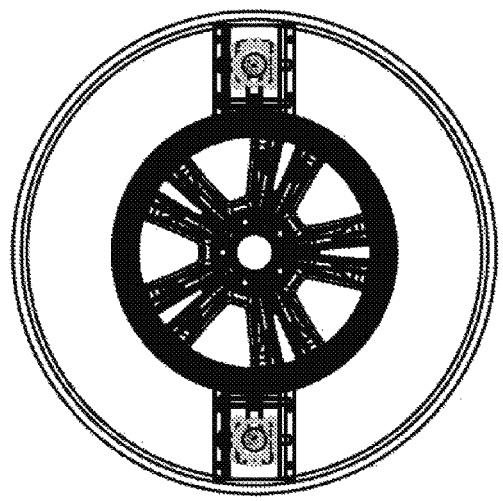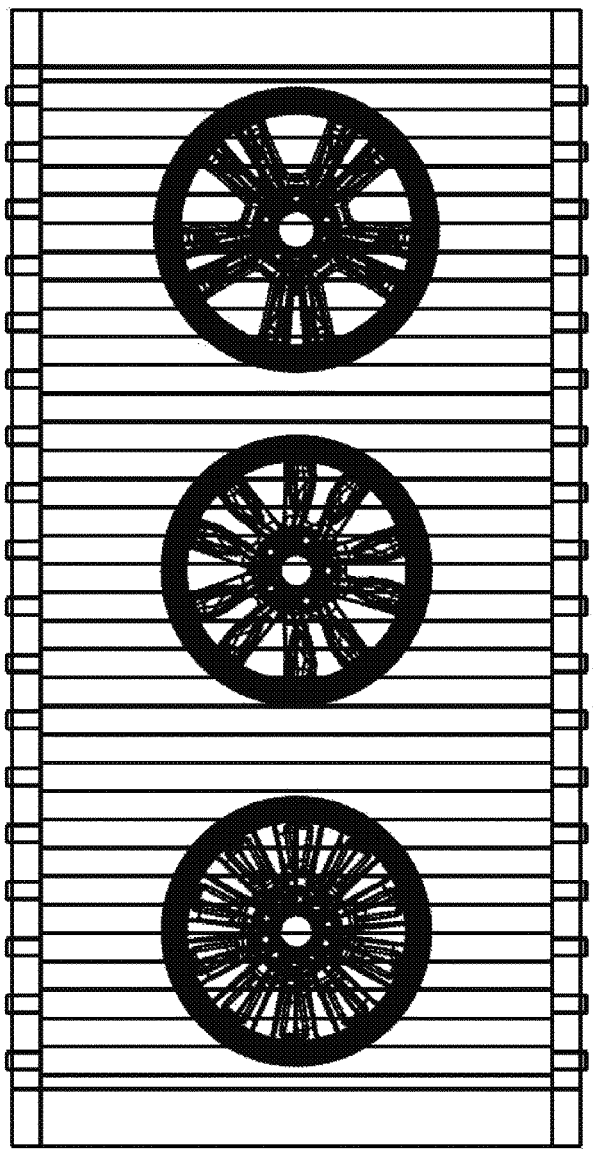
Figure 13

FLEXIBLE CLAMPING DEVICE

RELATED APPLICATION

This application claims priority to Chinese Patent Application No. 201710103786.3, filed on Feb. 24, 2017, which is hereby incorporated by reference in its entirety.

TECHNICAL FIELD

The present disclosure relates to a flexible clamping device, and specifically to a clamp capable of clamping hubs having different sizes.

BACKGROUND

With the propos of flexible production, it has attracted more and more attention of enterprises. The automatic line production can greatly improve labor productivity, save labor, reduce cost, increase returns and the like for enterprises. In the automatic production process of hub industry, mixed-line production has become a present universal production mode, which highly requires the flexibility of machine tool equipment

SUMMARY

The present disclosure is aimed at providing a flexible clamping device, which can perform mixed-line machining via self structure and a compaction device according to hubs having different sizes to realize flexible production.

In order to fulfill the above aim, the present disclosure adopts the technical solution: a flexible clamping device is composed of a housing, a shaft I, a sleeve I, a cylinder, a connector, a shaft II, a clamping spring, a protective pad, a pressure block, a shaft III, a sleeve II and a bottom plate.

The housing is fixed below the bottom plate via four bolts, one end of the shaft I is fixed on the housing via a step, and the other end of the shaft I is fixed on the housing via the sleeve I and the cylinder. A cylinder rod at the upper end of the cylinder is in threaded connection with the connector, the connector is articulated with the pressure block via the shaft II and the clamping spring, and the pressure block is articulated to the housing via the shaft III and the sleeve II. One end of the shaft III is fixed outside the housing via a shaft shoulder, and the other end is fixed outside the housing via a pin.

The bottom plate is provided with two steps on which wheels having different sizes are fixed respectively. When the small-sized wheel is put on the bottom step, the cylinder rod of the cylinder moves up linearly, the cylinder simultaneously moves right in the circumferential direction by using the shaft I as a rotating shaft to drive the connector to move right in a plane, the pressure block moves right in the circumferential direction by using the shaft III as a rotating shaft, the protective pad presses the hub of the wheel, and the function of compacting the small-sized wheel is thus realized.

When the large-sized wheel is put on the top step of the bottom plate, the cylinder rod of the cylinder moves up linearly, the cylinder simultaneously moves right in the circumferential direction by using the shaft I as a rotating shaft to drive the connector to move right in a plane, the pressure block moves right in the circumferential direction by using the shaft III as a rotating shaft, the protective pad presses the hub of the wheel, and the function of compacting the large-sized wheel is thus realized.

The flexible clamping device of the present disclosure in use can meet the requirement of mixed-line high precision clamping in the wheel burr brushing process, has the characteristics of ideal effect, high efficiency, safety and reliability in work and high degree of automation, and is particularly suitable for batch production on production lines.

BRIEF DESCRIPTION OF THE DRAWINGS

FIG. 12 is a schematic diagram indicating how the flexible clamping device of the present disclosure can move a wheel onto a convey belt.

FIG. 13 is a schematic diagram indicating a top view of how the flexible clamping device of the present disclosure can move a wheel onto a convey belt.

Figure 1:
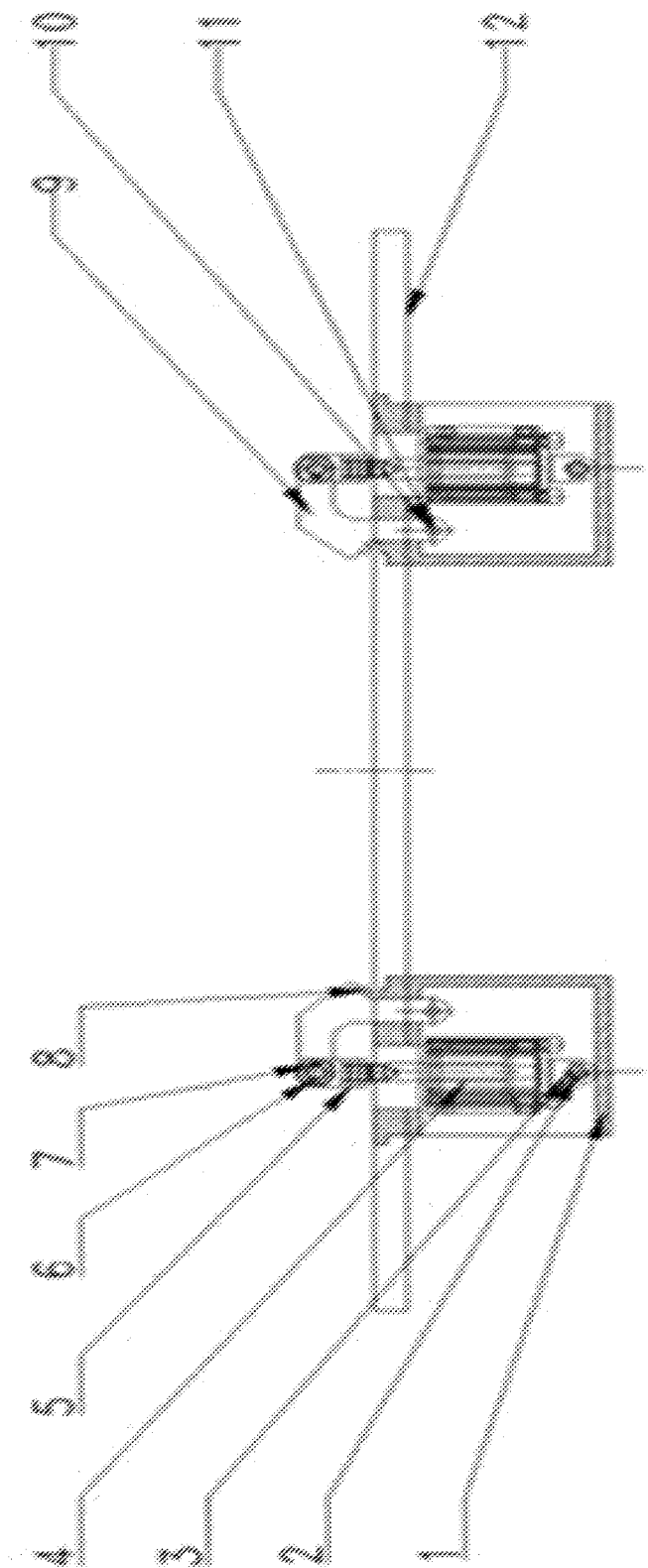
FIG. 1 is a structural schematic diagram of a flexible clamping device of the present disclosure.
Figure 2:
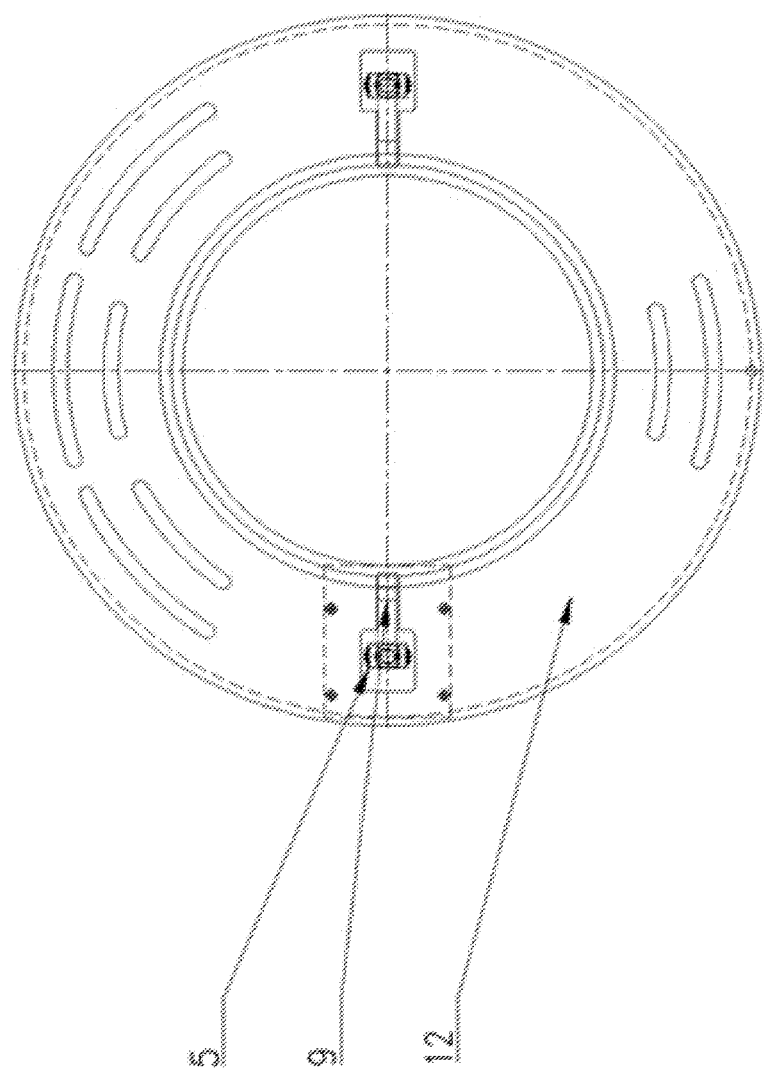
FIG. 2 is a top view of the flexible clamping device of the present disclosure.
Figure 3:
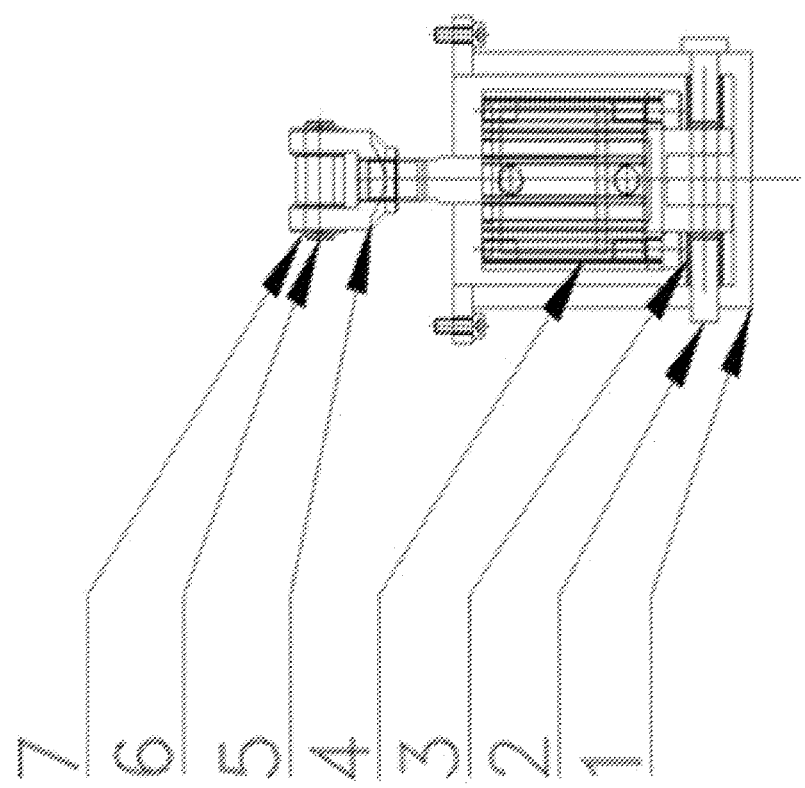
FIG. 3 is a side view of a compaction mechanism of the flexible clamping device of the present disclosure.
Figure 4:
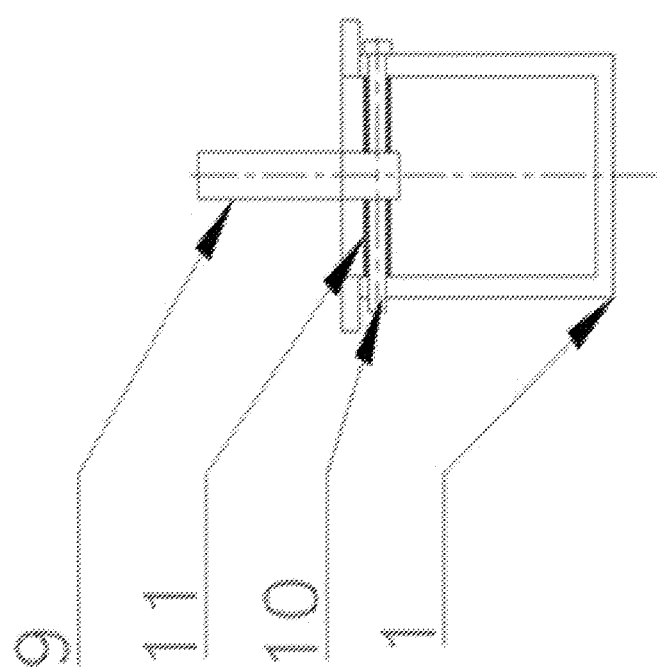
FIG. 4 is a side view 2 of the compaction mechanism of the flexible clamping device of the present disclosure.
Figure 5:
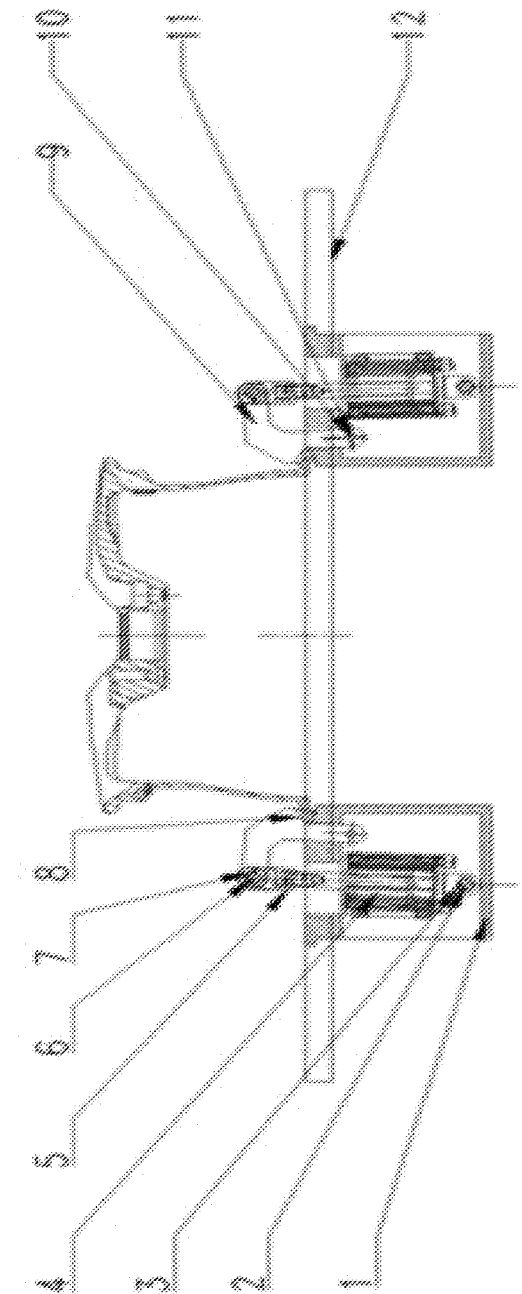
FIG. 5 is a schematic diagram indicating that the flexible clamping device of the present disclosure compacts a small-sized wheel.
Figure 6:
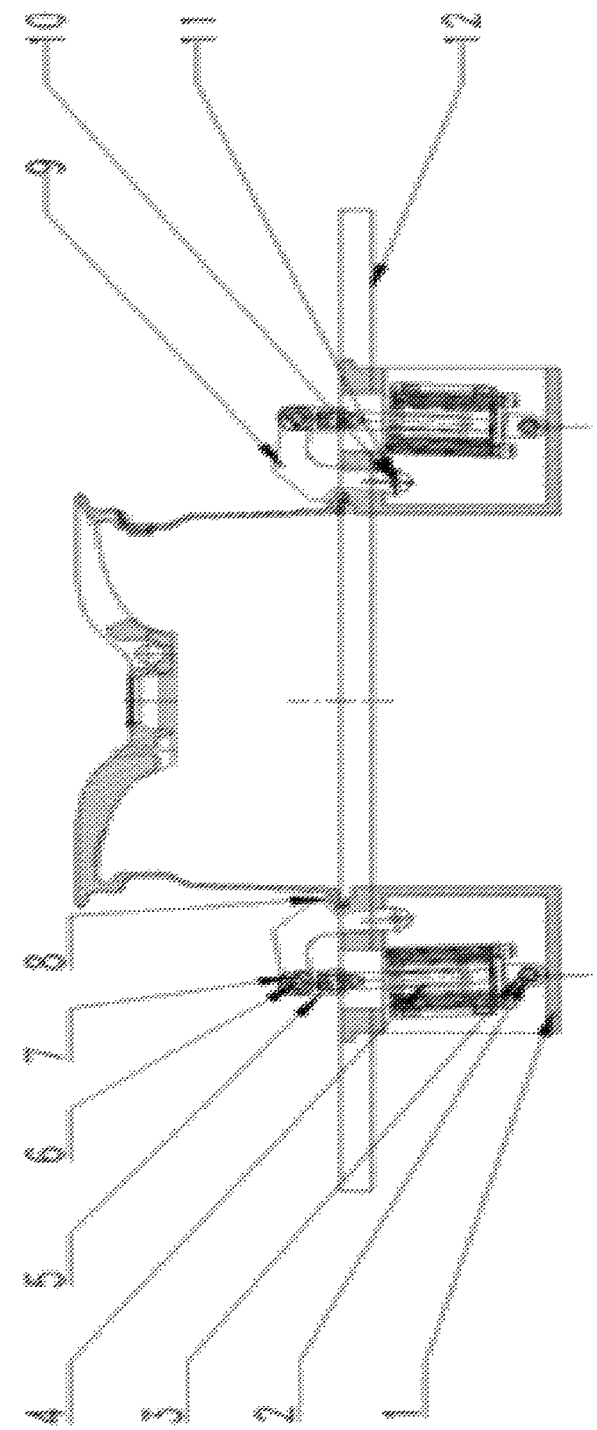
FIG. 6 is a schematic diagram indicating that the flexible clamping device of the present disclosure compacts a large-sized wheel.
Figure 7:
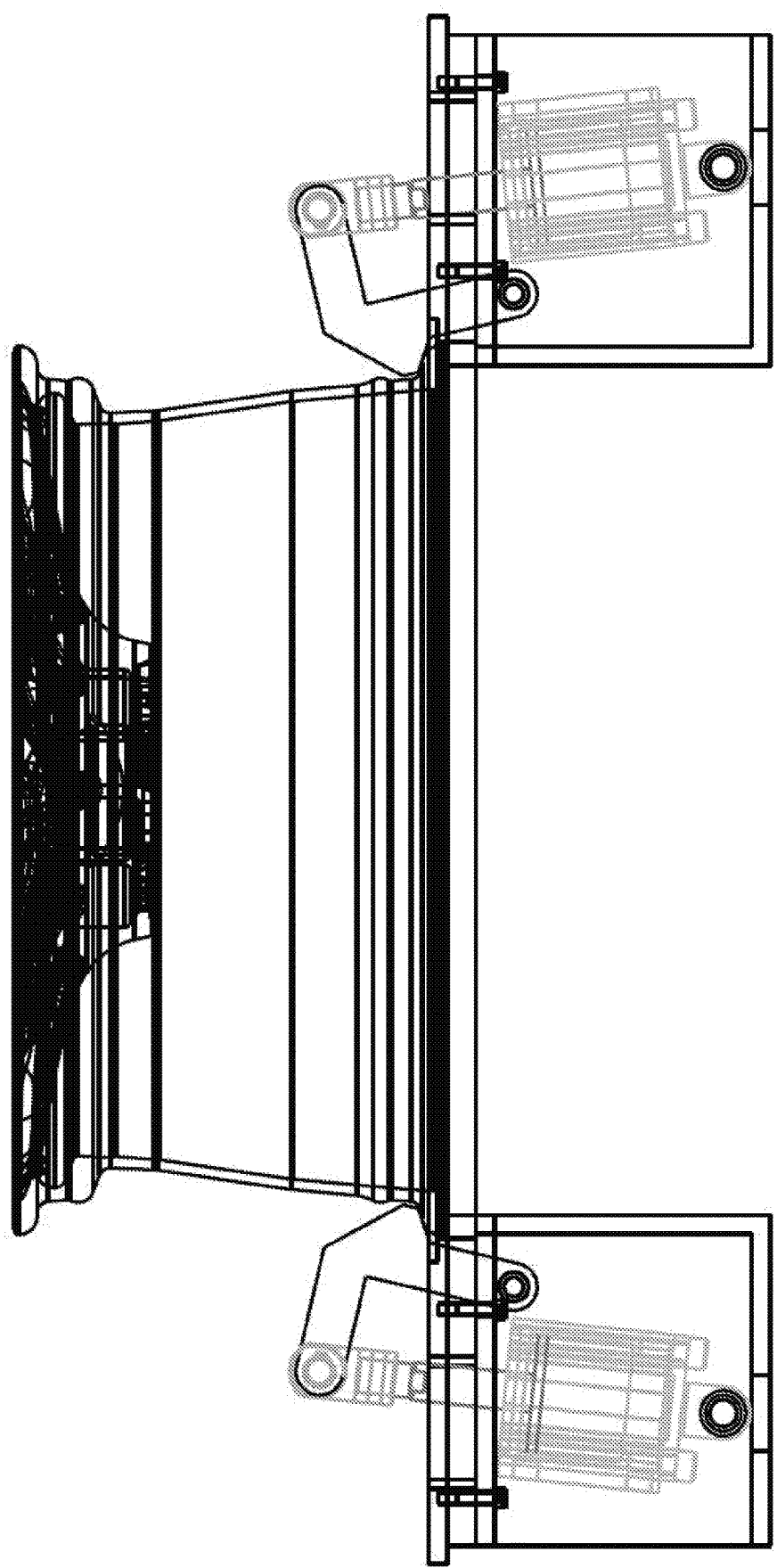
FIG. 7 is a schematic diagram indicating how a flexible clamping device of the present disclosure clamps a wheel.
Figure 8:
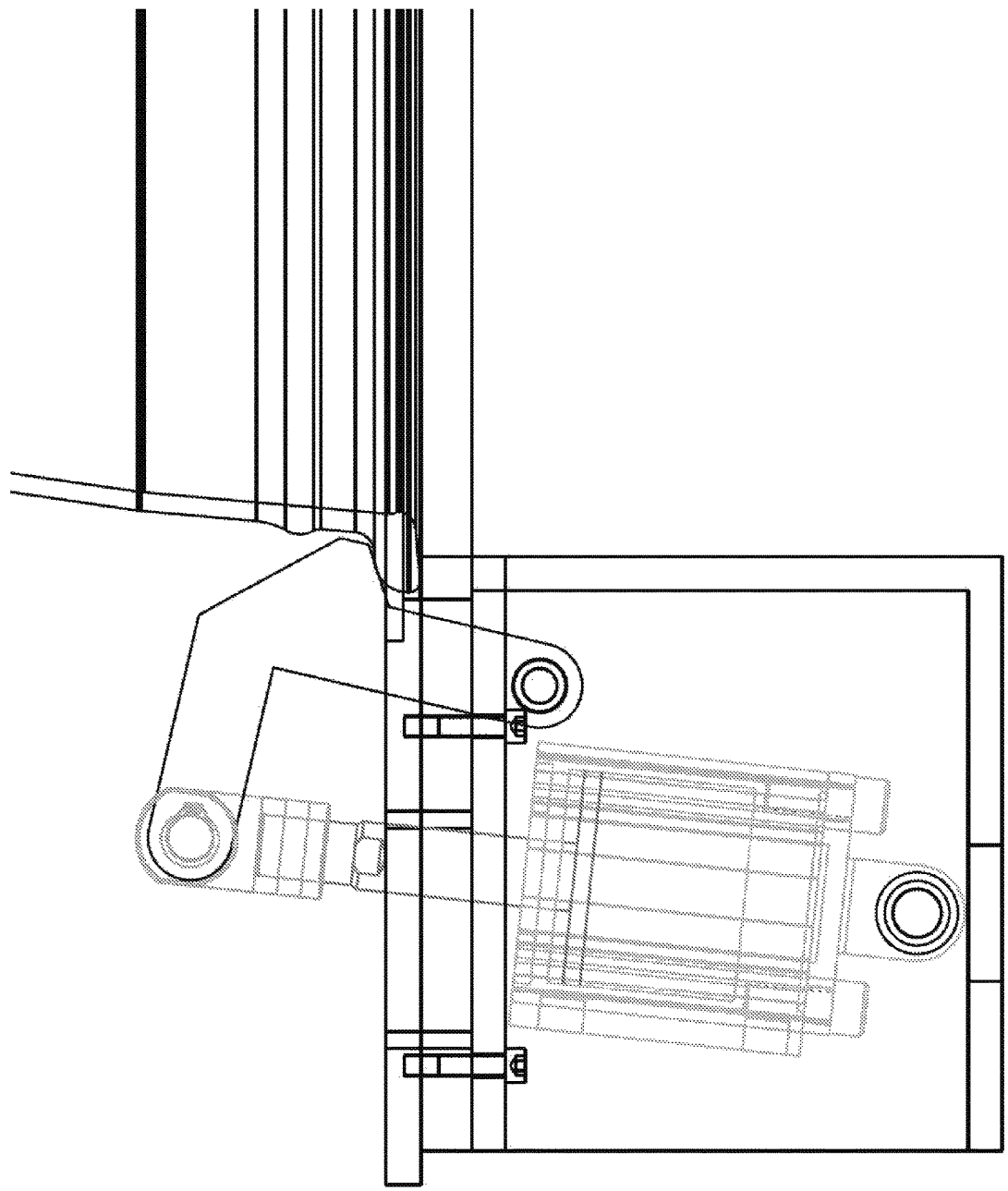
FIG. 8 is a schematic diagram illustrating a cross-section view of a portion of the flexible clamping device of the present disclosure.
Figure 9:
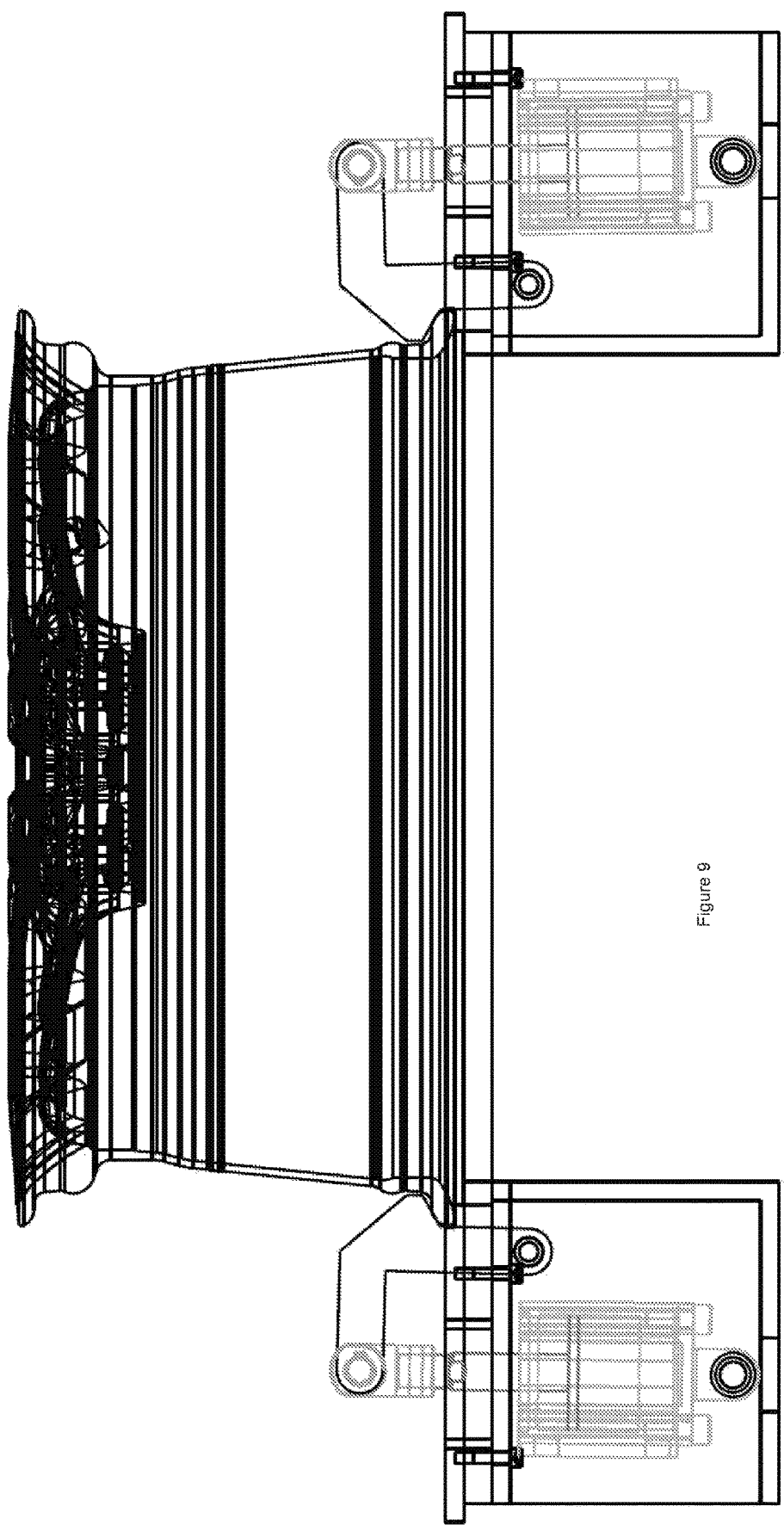
FIG. 9 is a schematic diagram illustrating a cross-section view of the flexible clamping device of the present disclosure clamping a wheel.
Figure 10:
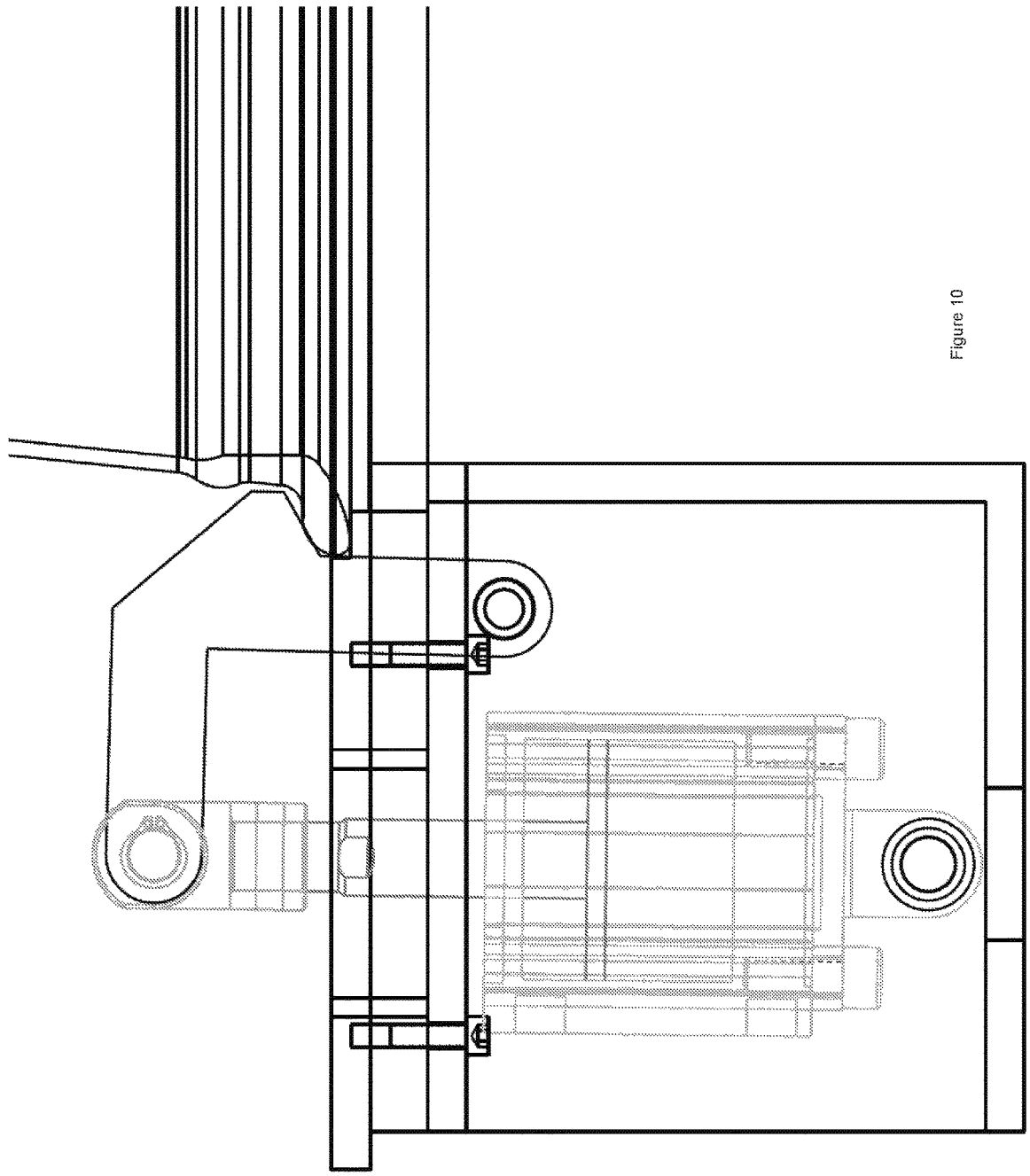
FIG. 10 is a schematic diagram illustrating another cross-section view of a portion of the flexible clamping device of the present disclosure.
Figure 11:
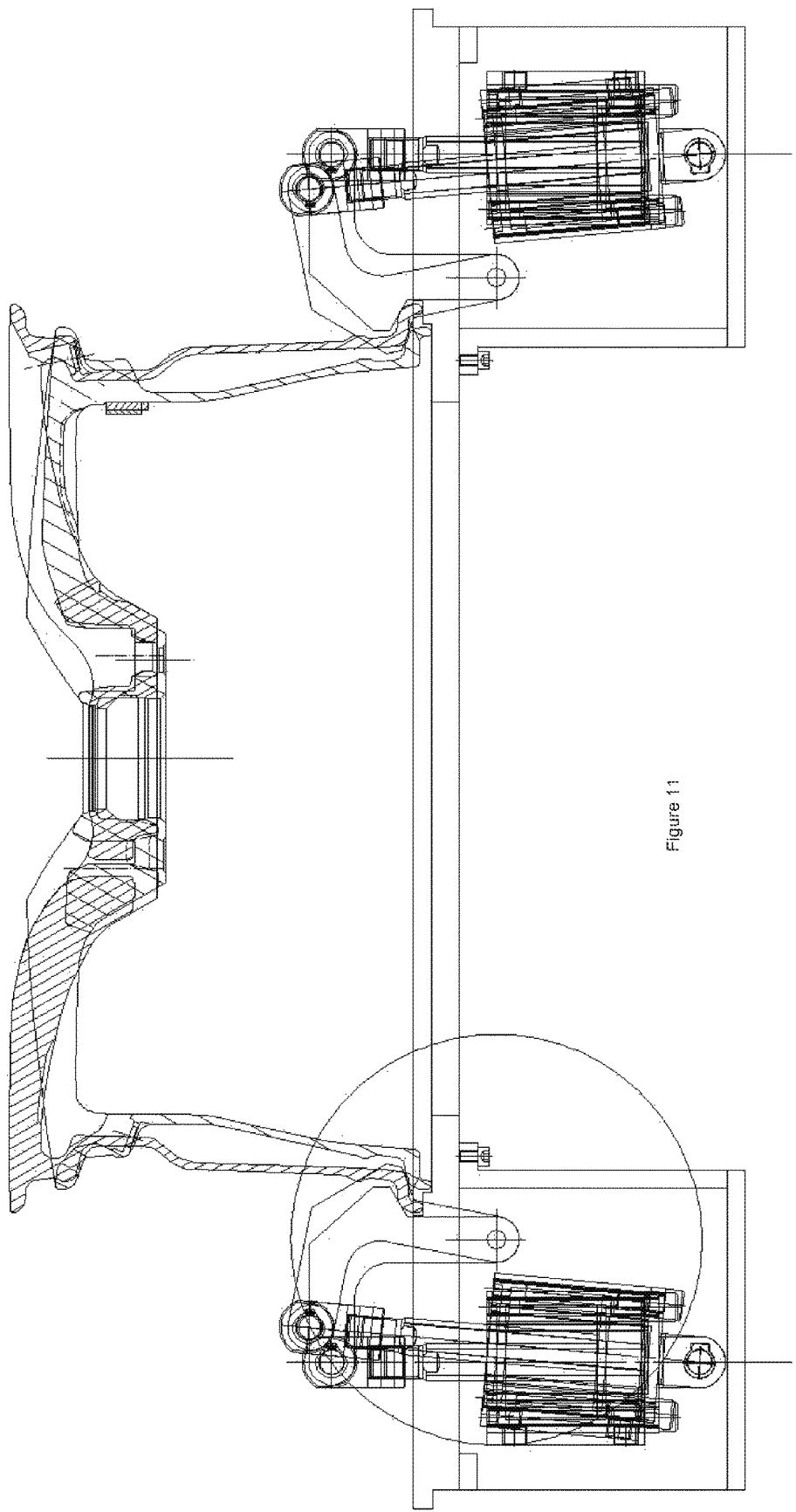
FIG. 11 is a schematic diagram indicating a schematic diagram indicating that the flexible clamping device of the present disclosure compacts a small-sized wheel.

In which: 1-housing, 2-shaft I, 3-sleeve I, 4-cylinder, 5-connector, 6-shaft II, 7-clamping spring, 8-protective pad, 9-pressure block, 10-shaft III, 11-sleeve II, 12-bottom plate.

DETAILED DESCRIPTION OF THE EMBODIMENTS

Details and working conditions of an example device provided by the present disclosure will be described below in combination with the accompanying drawings.

The device is composed of a housing 1, a shaft I 2, a sleeve I 3, a cylinder 4, a connector 5, a shaft II 6, a clamping spring 7, a protective pad 8, a pressure block 9, a shaft III 10, a sleeve II 11 and a bottom plate 12. The housing 1 is fixed below the bottom plate 12 via four bolts, one end of the shaft I 2 is fixed on the housing 1 via a step, and the other end of the shaft I 2 is fixed on the housing 1 via the sleeve I 3 and the cylinder 4.

A cylinder rod at the upper end of the cylinder 4 is in threaded connection with the connector 5, the connector 5 is articulated with the pressure block 9 via the shaft II 6 and the clamping spring 7, and the pressure block 9 is simultaneously articulated to the housing 1 via the shaft III 10 and the sleeve II 11. One end of the shaft III 10 is fixed outside the housing 1 via a shaft shoulder, and the other end is fixed outside the housing 1 via a pin.

The bottom plate 12 is provided with two steps on which wheels having different sizes are fixed respectively. When the small-sized wheel is put on the bottom step, the cylinder rod of the cylinder 4 moves up linearly, the cylinder 4 simultaneously moves right in the circumferential direction by using the shaft I 2 as a rotating shaft to drive the connector 5 to move right in a plane, the pressure block 9 moves right in the circumferential direction by using the shaft III 10 as a rotating shaft, the protective pad 8 presses the hub of the wheel, and the function of compacting the small-sized wheel is thus realized.

When the large-sized wheel is put on the top step of the bottom plate 12, the cylinder rod of the cylinder 4 moves up linearly, the cylinder 4 simultaneously moves right in the circumferential direction by using the shaft I 2 as a rotating shaft to drive the connector 5 to move right in a plane, the pressure block 9 moves right in the circumferential direction by using the shaft III 10 as a rotating shaft, the protective pad 8 presses the hub of the wheel, and the function of compacting the large-sized wheel is thus realized.

The invention claimed is:

1. A flexible clamping device is composed of a housing (1), a shaft I (2), a sleeve I (3), a cylinder (4), a connector (5), a shaft II (6), a clamping spring (7), a protective pad (8), a pressure block (9), a shaft III (10), a sleeve II (11) and a bottom plate (12), wherein the housing (1) is fixed below the bottom plate (12) via four bolts, one end of the shaft I (2) is fixed on the housing (1) via a step, and the other end of the shaft I (2) is fixed on the housing (1) via the sleeve I (3) and the cylinder (4); a cylinder rod at the upper end of the cylinder (4) is in threaded connection with the connector (5), the connector (5) is articulated with the pressure block (9) via the shaft II (6) and the clamping spring (7), and the pressure block (9) is simultaneously articulated to the housing (1) via the shaft III (10) and the sleeve II (11); one end of the shaft III (10) is fixed outside the housing (1) via a shaft shoulder, and the other end is fixed outside the housing (1) via a pin.

2. The flexible clamping device of claim 1, wherein the bottom plate (12) is provided with two steps on which wheels having different sizes are fixed respectively.

* * * * *